(12) United States Patent
De Oliveira

(10) Patent No.: US 9,346,216 B2
(45) Date of Patent: May 24, 2016

(54) EASY-OPENING REAM WRAP

(75) Inventor: Sergio Sobreira De Oliveira, Ribeirao Preto (BR)

(73) Assignee: International Paper Company, Memphis, TN (US)

( * ) Notice: Subject to any disclaimer, the term of this patent is extended or adjusted under 35 U.S.C. 154(b) by 1180 days.

(21) Appl. No.: 11/811,053

(22) Filed: Jun. 8, 2007

(65) Prior Publication Data

US 2008/0302067 A1 Dec. 11, 2008

(51) Int. Cl.
*B65D 85/00* (2006.01)
*B65D 85/12* (2006.01)
*B29C 65/00* (2006.01)
*B29C 65/18* (2006.01)
*B29C 65/30* (2006.01)
(Continued)

(52) U.S. Cl.
CPC .............. *B29C 66/836* (2013.01); *B29C 65/18* (2013.01); *B29C 65/305* (2013.01); *B29C 66/0042* (2013.01); *B29C 66/00441* (2013.01); *B29C 66/0242* (2013.01); *B29C 66/034* (2013.01); *B29C 66/1122* (2013.01); *B29C 66/232* (2013.01); *B29C 66/43121* (2013.01); *B29C 66/73713* (2013.01); *B29C 66/80* (2013.01); *B29C 66/9161* (2013.01); *B29C 66/91421* (2013.01); *B29C 66/91645* (2013.01); *B65B 51/10* (2013.01); *B29C 65/48* (2013.01); *B29C 65/5057* (2013.01); *B29C 66/73711* (2013.01); *B29C 66/8122* (2013.01); *B29C 66/8167* (2013.01); *B29C 66/919* (2013.01); *B29C 66/91423* (2013.01); *B29K 2023/06* (2013.01); *B29K 2023/12* (2013.01); *B29K 2905/02* (2013.01)

(58) Field of Classification Search
CPC ........ A45C 11/182; B42D 5/005; B42F 7/06; B42F 7/10; B42F 7/14; B65D 83/0847
USPC .............. 206/215, 449; 229/87.01, 92.1, 92, 229/87.18, 87.05, 136; 53/463, 466, 371.2, 53/71.3, 399, 432
See application file for complete search history.

(56) References Cited

U.S. PATENT DOCUMENTS 1,702,325 A * 2/1929 Van Sickels ..................... 53/432
2,354,989 A * 8/1944 Fusco ........................... 53/371.2
(Continued)

FOREIGN PATENT DOCUMENTS

| CA | 1198349 | 12/1985 |
|---|---|---|
| DE | 4336274 | 4/1995 |

(Continued)

*Primary Examiner* — Anthony Stashick
*Assistant Examiner* — Kaushikkumar Desai
(74) *Attorney, Agent, or Firm* — Thomas W Barnes, III

(57) ABSTRACT

A protective wrap material enclosing a stack of cut sheets of paper is folded so that overlapping flaps of the wrap material cover opposite ends of the stack. The overlapping flaps are secured and sealed together only at selected areas that comprise a minor portion of the overlapped flaps, wherein the sealed areas have sufficient burst strength to avoid inadvertent opening of the wrap but at the same time are relatively easy to separate when it is desired to open the wrap to gain access to the cut sheets of paper. In a preferred embodiment the wrap material is heat sealable, and a modified heat plate for applying heat only to the selected areas has a grooved front surface defining heat focusing bars that concentrate heat sufficient to fuse the wrap material only in the selected areas.

16 Claims, 6 Drawing Sheets

(51) Int. Cl.
  *B65B 51/10* (2006.01)
  *B29C 65/48* (2006.01)
  *B29C 65/50* (2006.01)
  *B29K 23/00* (2006.01)

(56) References Cited

U.S. PATENT DOCUMENTS

| | | | |
|---|---|---|---|
| 2,638,724 A * | 5/1953 | Harvey | 53/463 |
| 2,697,474 A * | 12/1954 | McGinley | 53/371.3 |
| 2,996,235 A * | 8/1961 | Turpin | 229/125.34 |
| 3,066,848 A | 12/1962 | Billeb | |
| 3,184,144 A * | 5/1965 | Greene et al. | 229/136 |
| 3,230,135 A * | 1/1966 | Hurst | 428/342 |
| 3,310,225 A * | 3/1967 | Hoblit et al. | 383/86 |
| 3,404,771 A | 10/1968 | Mann | |
| 3,648,833 A * | 3/1972 | Dash | 206/215 |
| 3,784,434 A * | 1/1974 | Paisley et al. | 156/280 |
| 3,788,933 A | 1/1974 | Nakazawa | |
| RE28,317 E * | 1/1975 | Goodrich | 383/85 |
| 3,932,260 A | 1/1976 | Balentine, Jr. | |
| 3,993,532 A | 11/1976 | McDonald et al. | |
| 4,079,570 A | 3/1978 | Rucker | |
| 4,081,580 A * | 3/1978 | Kato | 428/134 |
| 4,192,420 A | 3/1980 | Worrell, Sr. et al. | |
| 4,473,432 A | 9/1984 | Leader et al. | |
| 4,572,753 A | 2/1986 | Bach | |
| 4,647,325 A | 3/1987 | Bach | |
| 4,744,467 A | 5/1988 | Jonsson et al. | |
| 4,854,984 A | 8/1989 | Ball et al. | |
| 4,914,892 A * | 4/1990 | Saito et al. | 53/399 |
| 5,058,361 A | 10/1991 | Schmacher | |
| 5,175,978 A * | 1/1993 | Knauf | 53/463 |
| 5,250,348 A * | 10/1993 | Knauf | 428/211.1 |
| 5,421,512 A | 6/1995 | Poole | |
| 5,954,201 A * | 9/1999 | Finch et al. | 206/440 |
| 6,338,572 B1 * | 1/2002 | Schneck | 383/205 |
| 6,601,706 B2 * | 8/2003 | McManus et al. | 206/526 |
| 6,640,522 B2 * | 11/2003 | Antoniazzi et al. | 53/466 |
| 6,681,934 B2 * | 1/2004 | Kolterjohn et al. | 206/438 |
| 6,705,465 B2 * | 3/2004 | Ling et al. | 206/440 |
| 7,297,410 B2 * | 11/2007 | Nowak et al. | 428/513 |
| 2002/0022114 A1 | 2/2002 | Sorensen et al. | |
| 2002/0060167 A1 * | 5/2002 | Nichols et al. | 206/440 |
| 2002/0063076 A1 * | 5/2002 | Kolterjohn et al. | 206/440 |
| 2003/0023217 A1 * | 1/2003 | McManus et al. | 604/385.01 |
| 2004/0157025 A1 | 8/2004 | Knauf | |
| 2005/0202191 A1 * | 9/2005 | Nowak et al. | 428/35.2 |
| 2006/0027637 A1 * | 2/2006 | Conrad et al. | 229/87.05 |
| 2008/0264561 A1 | 10/2008 | Laue et al. | |
| 2009/0001143 A1 | 1/2009 | Cowan et al. | |
| 2009/0183469 A1 | 7/2009 | Knauf | |
| 2009/0218032 A1 | 9/2009 | Shimizu et al. | |
| 2009/0292266 A1 | 11/2009 | Back | |

FOREIGN PATENT DOCUMENTS

| | | |
|---|---|---|
| DE | 4441006 | 5/1996 |
| EP | 0351553 | 1/1990 |
| EP | 1288141 | 3/2003 |
| EP | 1393848 | 8/2003 |
| GB | 615594 | 8/1946 |
| GB | 1336217 | 11/1973 |
| GB | 1548226 | 7/1979 |
| WO | WO 02/085711 | 10/2002 |
| WO | 2006001889 | 1/2006 |
| WO | 2009082277 | 7/2009 |

\* cited by examiner

EASY-OPENING REAM WRAP

TECHNICAL FIELD

This invention relates generally to wraps for reams of cut paper, and in particular relates to a ream wrap that is easy to open.

BACKGROUND ART

Cut sheets of paper for use in photocopiers, printers and like equipment are typically packaged in stacks containing from 100 to 800 sheets of paper, depending upon the type of paper being packaged and its purpose. A ream of paper normally contains 500 sheets, but as used herein a ream is intended to cover a stack of cut sheets regardless of the number of sheets in the stack. The packages, or reams, normally are individually wrapped or covered with a ream wrap material and the wrapped reams usually are packaged in a box or carton for shipment and storage. The ream wrap maintains the stack of sheets intact, protects the wrapped paper from physical damage and moisture pickup during shipping and storage, and also protects the paper during handling and storage at the point of sale and/or point of use. When the need arises for loading paper into a machine that uses the paper, the ream wrap is removed from one or more reams of paper and the paper is placed in the bin or other compartment of the machine for supplying paper to the machine during its operation.

Ream wrap typically comprises paper, or paper coated with a moisture resistant material or otherwise treated to obtain a desired property, or a poly film that may consist of a relatively heavy gauge monolayer film or a composite of two or more separate layers of lighter weight plastic films laminated together with an adhesive. The wrap is applied by placing a stack of cut sheets of paper on a sheet of ream wrap material that is then moved through a wrapping machine that folds the wrap about the stack and seals it to enclose the stack. The wrap normally is applied so that two long edges extend in the longitudinal direction of the stack and overlap at the midportion of the top of the stack. These overlapped edges can be heat sealed or adhesively attached together with glue, and in a finished package the longitudinal seam produced by these sealed together overlapped edges is on the bottom surface of the package. The longitudinally seamed wrap is then folded inwardly at the sides where it extends past the ends of the stack, followed by inwardly folding the material that extends past the ends of the stack at the top and bottom, defining two overlapping flaps. This inwardly folded material at the ends of the stack is adhesively attached or heat sealed together to secure the wrap about the ream of paper.

For instance, adhesive is normally used on paper wraps, and sometimes on poly wraps, to secure together the overlapped wrap material on the ends of a ream. Seals produced by adhesive are generally inferior in quality compared with heat seals, especially when used on poly wrap, since the adhesive can get on the cut sheets of paper and precise positioning and quantity of adhesive applied can be difficult to control.

In ream wrap that is heat sealed, the wrap comprises a heat sealable material, which can comprise a poly film or a coated paper or other heat sealable material that is capable of being fused together by the application of heat. The ends of the wrapped ream, where the wrap is inwardly folded and overlapped, are heat sealed by applying heat to fuse the material together. In conventional heat-sealing systems belts at each end of the wrapped reams convey the reams through a heating zone having one or more heat plates positioned at each side of the zone, and as the ream is conveyed through the heating zone the plates apply heat to the ends of the wrapped ream to fuse the wrap together where it overlaps at the ends. In conventional machines the plates apply heat to the entire end of the wrapped package, whereby the entire area of overlapped wrap material is fused and sealed together. This results in a strong attachment that is not likely to rupture during handling and storage, but it is also difficult to open.

It would be desirable, therefore, to have a ream wrap that has all the desirable properties of conventional ream wrap, including adequate strength to avoid bursting during handling and storage, but which is also easy to open.

DISCLOSURE OF THE INVENTION

The present invention comprises a ream wrap that has all the desirable properties of conventional ream wrap, including adequate strength to avoid bursting during handling and storage, but which is easy to open.

The ream wrap of the invention is wrapped around a stack of cut sheets of paper using substantially conventional ream wrapping equipment, with the wrap being folded about the stack and the longitudinal seam being sealed conventionally. However, the material at the ends of the ream is secured and sealed together only at selected areas. In a preferred embodiment there are a plurality of said selected areas extending across said overlapped flaps from one side to the other in parallel, spaced apart relationship to one another. The areas sealed are sufficient to provide adequate burst strength while at the same time being relatively easy to separate when it is desired to open the ream.

Stated more particularly, the invention comprises a stack of cut sheets of paper wrapped with a protective wrap material enclosing the stack and folded so that overlapping flaps of the wrap material cover opposite ends of the stack, said overlapping flaps being secured and sealed together only at selected areas that comprise a minor portion of the overlapped flaps, said sealed together areas comprising bands extending in spaced apart parallel relationship to one another across the width of said flaps from one side thereof to the other, a substantial portion of an outer edge of an outer overlapping flap not being sealed and comprising a free edge that may be gripped to facilitate opening of the wrapped stack of cut sheets of paper, wherein the sealed areas have sufficient burst strength to avoid inadvertent opening of the wrap during handling and storage but are relatively easy to separate when it is desired to open the wrap to gain access to the cut sheets of paper.

In a preferred embodiment of the invention the ream wrap material is heat sealable and the material at the ends of the ream is attached and sealed at the selected areas by applying heat, preferably between about 115° C. and 196° C. The heat is applied by heating elements designed to heat the material adequately to fuse it together in the selected areas. The heating elements may take any form and shape, but in a further preferred embodiment of the invention they comprise heat plates having portions cut away to define raised areas that concentrate heat in the selected areas.

In a still further preferred embodiment, temperature control means are associated with the heating elements to obtain a temperature curve across the length of the heating zone, wherein the temperatures at the entry and exit portions of the zone are less than the temperature at a midportion of the zone. This avoids wrinkling or puckering of the wrap material that might otherwise occur if the same temperature is applied across the entire length of the zone.

Further in accordance with the invention, friction reducing means is associated with the heating elements and/or belts to reduce wear on the ream conveying belts as they move past the heating elements. In the particular examples described herein the cut-away areas of the heating plates preferably are filled with a low friction material such as Teflon, all exposed corners and edges are smoothly rounded, and the heating plates are made of or coated with a low friction material, such as, e.g., nickel-chrome, whereby the belts each slide past a smooth, flat, low friction surface.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein.

BEST MODES FOR CARRYING OUT THE INVENTION

Figure 1:
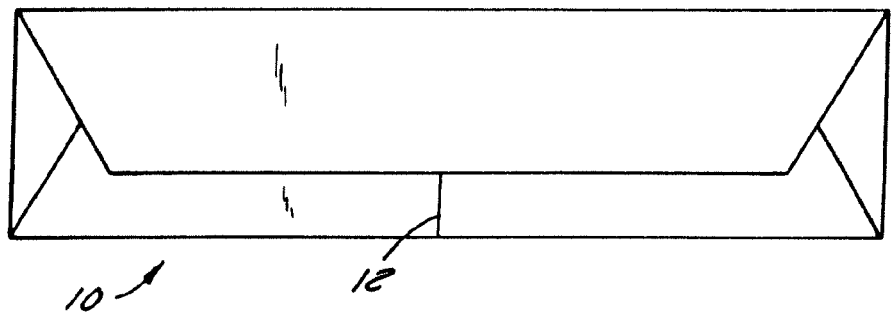
FIG. 1 is an end view in elevation of a conventionally wrapped and sealed ream of paper.
Figure 3:
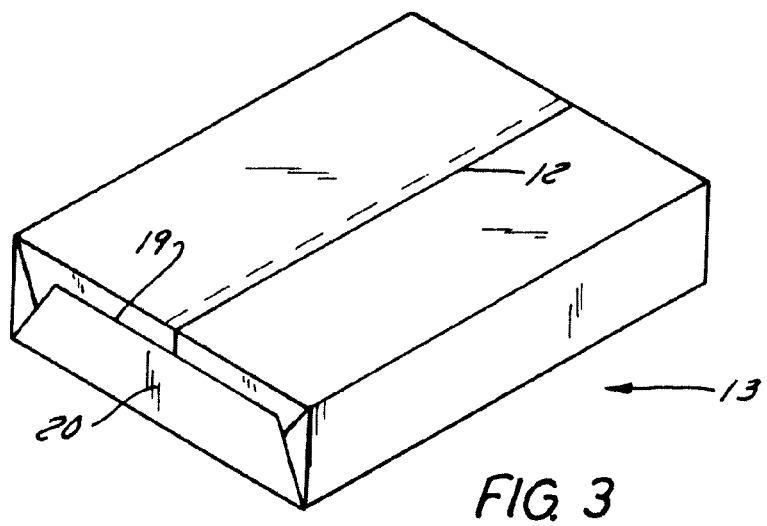
FIG. 3 is a bottom and end perspective view of a wrapped and sealed ream of paper, showing the longitudinal seam extending along the bottom.
Figure 4:
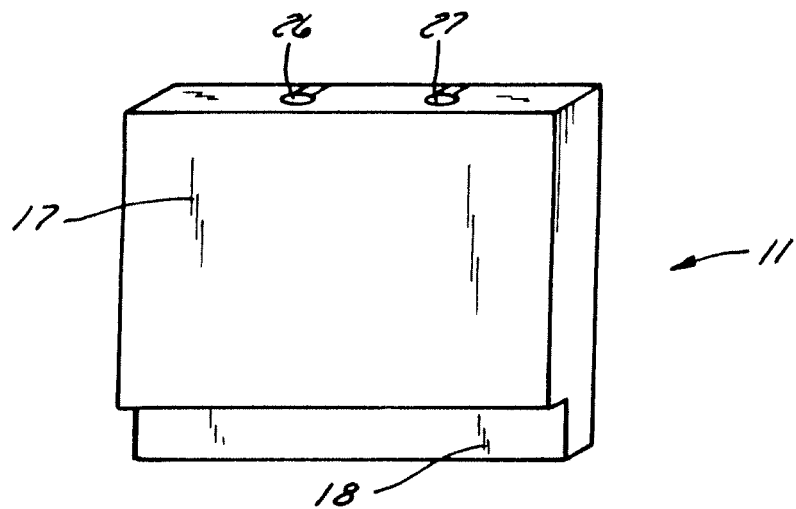
FIG. 4 is a front perspective view of a conventional heat plate for heating and fusing the end of the ream wrap of the package in FIG. 1.
Figure 5:
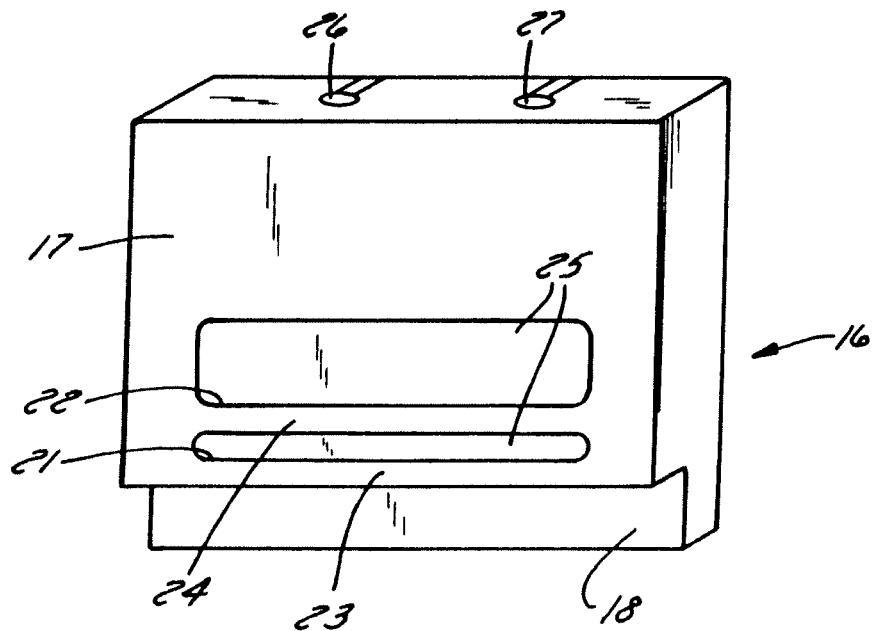
FIG. 5 is a slightly enlarged front perspective view of a heating plate according to a most preferred form of the invention.

With more specific reference to the drawings, a ream of paper wrapped with any of the conventionally available heat sealable wraps is indicated generally at 10 in FIG. 1. Heat is applied to the entire end surface of the wrapped ream by using one or more heating plates 11 as shown in FIG. 4, whereby all of the overlapped material of the wrap at the ends of the ream is fused together. As seen in FIG. 3, the longitudinal edges of the wrap material are overlapped and secured together, either with an adhesive or by heat sealing, to define a longitudinal girth seam 12 extending longitudinally of a midportion of the underside of the ream.

Figure 2:
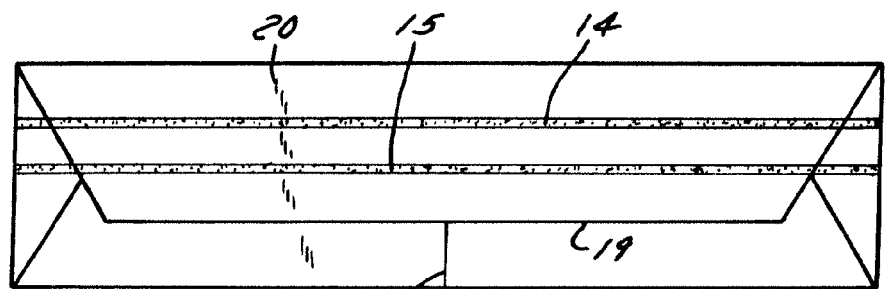
FIG. 2 is an end view in elevation of a ream of paper sealed in accordance with a first embodiment of the invention, wherein there are two sealed areas.

A ream of paper wrapped and sealed in accordance with a first embodiment of the invention is indicated generally at 13 in FIG. 2. The overlapped material at the ends of the ream is fused together only in selected areas as indicated by the shaded areas 14 and 15. In this example there are two sealed together areas.

The wrap may comprise any of the commercially available heat sealable materials, and in a specific preferred example comprises laminated films of heat sealable bi-axial polypropylene film, with one film being clear and having a unit weight of 18 $g/m^2$ and a gauge of 20 microns, and the other film being opaque and having a unit weight of 22 $g/m^2$ and a gauge of 30 microns. The films are laminated together at the converter with an isocyanate polyol adhesive, with the clear film typically being on the inside and the opaque film on the outside of the wrap. It should be understood that different adhesives can be used to laminate the films and different combinations of weight and gauge for the clear and opaque films may be used. Further, a monolayer clear or opaque film or composite of two clear or opaque films may be used. Similarly, polyethylene may be used instead of polypropylene in making the film or films, although wrap quality can be affected. In addition, polymer lined paper wrap may be used. Also, varnish coated polymer wrap and/or varnish-coated paper wrap may be used.

While any ream wrap material may be utilized according to the present invention, it is preferred that the ream wrap have a basis weight as measured by TAPPI 410 of from 30 to 50, more preferably from 32 to 45, most preferably from 33 to 40 lbs/300 square ft, including any and all ranges and subranges therein.

While any ream wrap material may be utilized according to the present invention, it is preferred that the ream wrap have a caliper as measured by TAPPI 411 of from 1.5 to 4 mils, more preferably from 2 to 3, most preferably from 2.4 to 2.6 mils, including any and all ranges and subranges therein.

While any ream wrap material may be utilized according to the present invention, it is preferred that the ream wrap have a MD Tensile Strength as measured by TAPPI 494 of from 15 to 50, more preferably from 17 to 40, most preferably from 19 to 35 lbs/inch, including any and all ranges and subranges therein.

While any ream wrap material may be utilized according to the present invention, it is preferred that the ream wrap have a CD Tensile Strength as measured by TAPPI 494 of from 15 to 60, more preferably from 20 to 50, most preferably from 25 to 45 lbs/inch, including any and all ranges and subranges therein.

While any ream wrap material may be utilized according to the present invention, it is preferred that the ream wrap have a burst as measured by TAPPI 403 of from 140 to 200, more preferably from 145 to 185, most preferably from 150 to 175 lbs/square inch, including any and all ranges and subranges therein.

While any ream wrap material may be utilized according to the present invention, it is preferred that the ream wrap have a MD Tear as measured by TAPPI 414 of from 5 to 40, more preferably from 10 to 30, most preferably from 15 to 25 gms, including any and all ranges and subranges therein.

While any ream wrap material may be utilized according to the present invention, it is preferred that the ream wrap have a CD Tear as measured by TAPPI 414 of from 3 to 30, more preferably from 5 to 25, most preferably from 10 to 20 gms, including any and all ranges and subranges therein.

While any ream wrap material may be utilized according to the present invention, it is preferred that the ream wrap have a MD Stiffness as measured by TAPPI 543 of from 5 to 50, more preferably from 10 to 40, most preferably from 15 to 30 mg, including any and all ranges and subranges therein.

While any ream wrap material may be utilized according to the present invention, it is preferred that the ream wrap have a CD Stiffness as measured by TAPPI 543 of from 10 to 60, more preferably from 15 to 50, most preferably from 20 to 45 gms, including any and all ranges and subranges therein.

A most preferred form of heating plate for heating and fusing the wrap shown in FIG. 2 is indicated generally at 16 in FIGS. 5-8. The plate is made of a suitable heat transmitting material and preferably is generally rectangular in shape, with a front surface 17 that faces the end of the ream. In a preferred embodiment the plate is made of aluminum and has a nickel-chrome coating to reduce friction on the belts 31, 32 that convey the ream past the heating elements (see below). The lower front edge portion of the plate is recessed at 18, whereby this recessed area does not transmit as much heat to the end of the wrapped ream and a lower edge portion 19 of the flap 20 on the end of the ream therefore remains unattached to the underlying material, defining a free edge that may be gripped to facilitate opening of the ream. A pair of grooves 21 and 22 also is formed in the front surface 17, terminating short of the opposite side edges of the plate, with the first groove 21 (see FIG. 7) having a first width W1 and spaced a first distance D1 from the top of the recessed area 18, and the second groove 22 having a second width W2, greater than the first width and spaced a distance D2 from the first groove equal to the spacing of the first groove from the recessed area. The recessed area and grooves define a pair of heat focusing bars 23 and 24 extending most of the width of the plate and each having a width W3 corresponding to the distances D1 and D2. In this most preferred embodiment the grooves are filled with a low friction material 25, such as Teflon. It will be noted that the plates have no sharp edges that are exposed to the belts, with the leading and trailing edges of the plates being rounded as at 28 and 29.

Suitable conventional electrical resistance heating elements or rods (not shown) are received in bores 26 and 27 extending vertically in the heating plate approximately equidistant from one another and from opposite side edges of the plate so that the heating elements substantially uniformly heat the plate. By orienting the grooves and heating elements vertically the elements can be replaced from above the plates. In conventional heating plates the heating elements are oriented horizontally. Although any suitable heating elements can be used, in a preferred embodiment the heating elements are 500 and 1000 watt elements made by Watlow, model numbers J19J-3220 and J19J-2156. The heating elements may be used in any combination to achieve a desired result.

Figure 7:
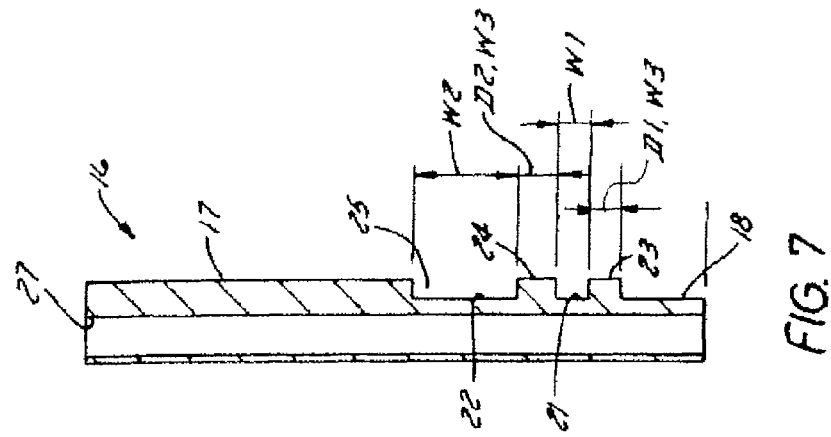
FIG. 7 is a transverse sectional view of the heating plate of FIG. 6, taken along line 7-7.
Figure 6:
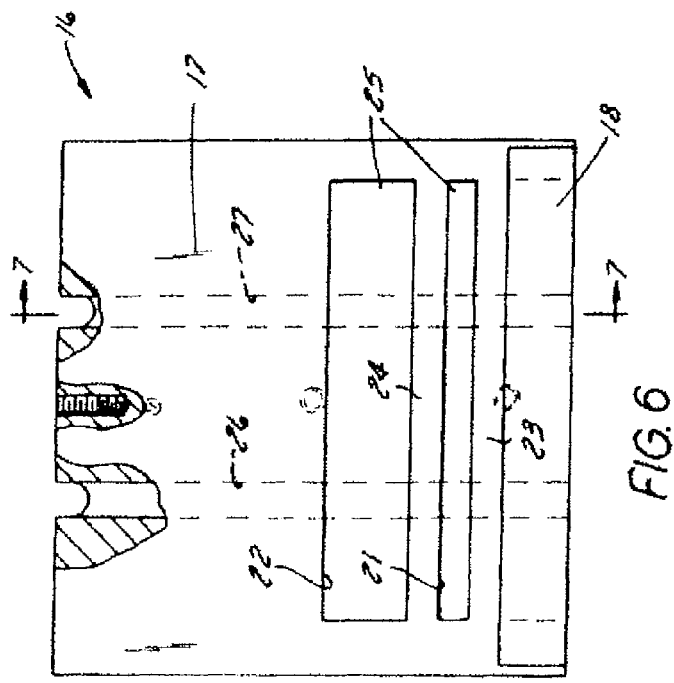
FIG. 6 is a front view in elevation of the heating plate of FIG. 5, showing the positions of the electrical resistance heating elements in the plate.
Figure 8:
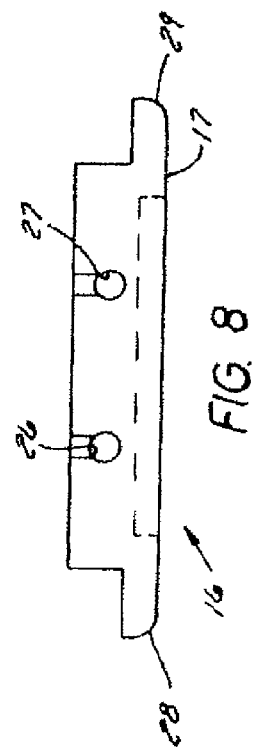
FIG. 8 is a top plan view of the heating plate of FIG. 5.

In a specific example of a plate made in accordance with the invention, the recessed area 18 is about 18.5 mm wide, defining an "ear" or free edge 19 on the flap 20 of about 8-10 mm width, the first and second distances D1 and D2, and thus the widths W3 of the heat focusing bars 23 and 24, are about 8 mm, and the widths W1 and W2 of the grooves are about 7 mm and 24 mm, respectively. Further, as shown in FIG. 7, it will be noted that the Teflon filler is recessed slightly into the grooves 21 and 22. This may done to accommodate expansion of the filler as it heats up, whether it is Teflon or some other material, whereby the filler front surface is flush with the plate front surface. This construction produces fused areas 14 and 15 on the end of the wrapped ream, each having a width of approximately 8 mm, and that extend across the width of the ream, spaced upwardly from the lower edge 19 of the flap 20.

It should be noted that while the widths and distances mentioned above are preferred embodiments of the present invention, such widths and distances may be any width and distance, or combination thereof, so long as the ream wrap functions in a manner that balances ease of opening, yet avoids bursting during handling and storage. For example, it is preferable that the burst and seal strength of the ream wrap package balances burst and seal strength in a manner that avoids bursting during handling and storage, yet allows one to easily grip an unsealed edge of at least one of the overlapped end flaps; pick up the package by this unsealed edge, shake the package by the unsealed edge to open the end (i.e. overlapped heat sealed flaps) and gain access to the paper inside.

Figure 9:
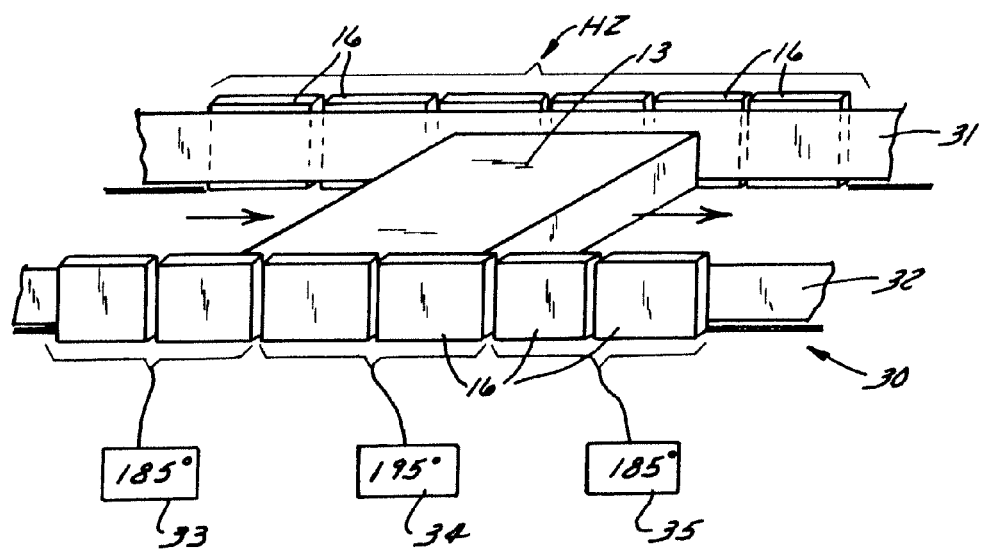
FIG. 9 is a somewhat schematic top perspective view of the heating zone of a wrapping machine having temperature control means according to the invention, showing the heating plates, conveying belts, and temperature control means at opposite sides of the zone.

An apparatus for fusing and sealing the ends of the ream wrap is indicated generally at 30 in FIG. 9. The apparatus comprises a heating zone HZ defined by one or more heating plates 16 aligned along opposite sides of the zone, and belts 31, 32 sliding along the inwardly facing surfaces of the heating plates and engaging the opposite ends of the wrapped reams 13 to convey the reams through the zone. The belts are made of a material that will transfer heat from the plates to the wrap material, and in a preferred embodiment comprise fiberglass coated with polytetrafluoroethylene (PTFE). As seen in this example, there are six heating plates arrayed along each of the opposite sides of the zone, with heat control means 33, 34 and 35 associated with respective pairs of plates on each side of the zone (for sake of clarity, the control means are shown on only one side of the zone in this figure) so that a temperature curve can be obtained across the length of the zone. More specifically, the temperature control means, and/or selection of appropriate heating element wattage, regulate the temperature to which the plates are heated so that the plates at the entrance and exit of the zone are heated to a lesser extent than the plates at the midportion of the zone. In a specific example, the plates at the entrance and exit may be heated to about 185° C. while the plates at the midportion are heated to about 195° C.

Figure 10:
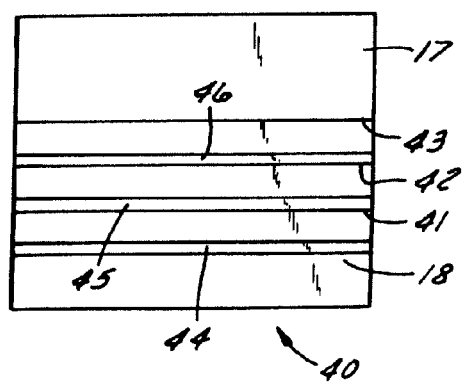
FIG. 10 is a front perspective view of a second embodiment of heating plate according to the invention, wherein the cut away areas extend the full width of the plate, defining three raised heat focusing bars extending the full width of the plate, and wherein the cut away areas are left open or unfilled.
Figure 10A:
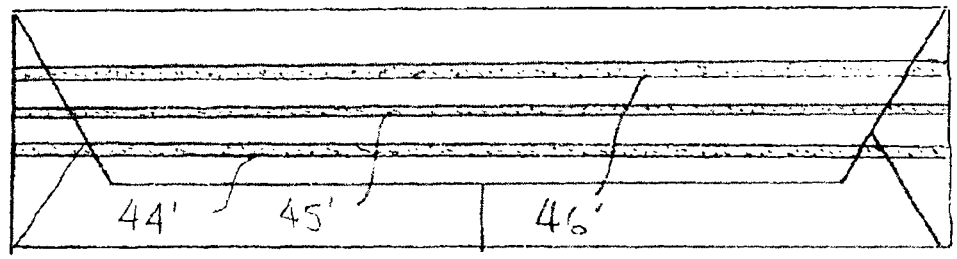
FIG. 10A is an end view in elevation of a ream of paper sealed in accordance with the apparatus shown in FIG. 10, wherein there are three sealed areas.

A second embodiment of plate that may be used in practicing the invention is indicated generally at 40 in FIG. 10. In the plate of this embodiment there are three open grooves 41, 42 and 43 of equal width and spacing extending completely across the width of the plate, defining three equally spaced heat focusing bars 44, 45 and 46, all of equal width. Otherwise, the plate 40 is constructed and functions substantially identically to the first embodiment described above, except that the grooved areas are 10 mm wide and 8 mm deep, and the sealing areas or heat focusing bars are 5 mm wide. FIG. 10A depicts a ream of paper wherein the overlapped material at the ends of the ream is sealed in three areas 44', 45' and 46'.

Figure 11:
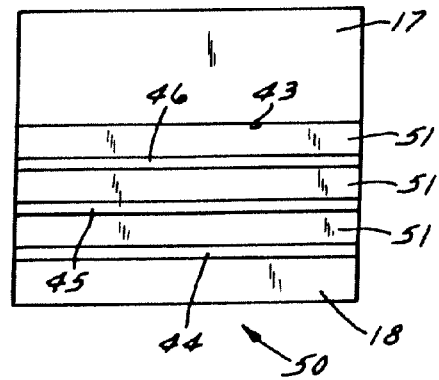
FIG. 11 is a front perspective view of a third embodiment of heating plate according to the invention, wherein the plate is substantially identical to the plate shown in FIG. 10 except that the cut away areas are filled with a low friction material such as Teflon.

A third embodiment of heat plate is shown at 50 in FIG. 11. This plate differs from that shown in FIG. 10 in that the grooves are filled with a low friction material 51 such as Teflon.

Figure 12:
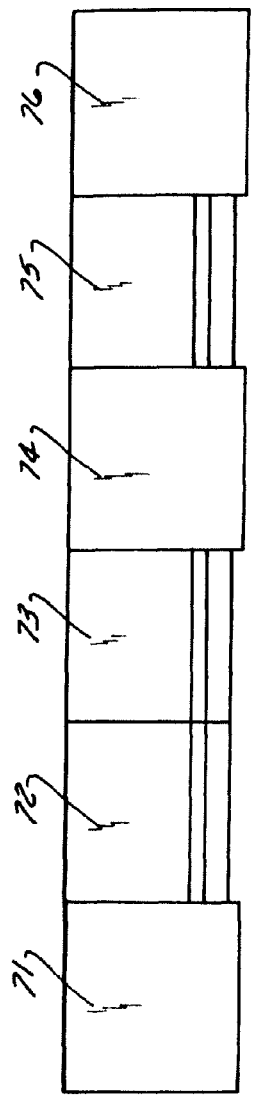
FIG. 12 is a front view in elevation of a gang of six heating elements according to the invention, wherein some of the heating elements do not have cut away areas defining heat-focusing heating bars.

FIG. 12 shows an alternate arrangement of heating plates, wherein there are six plates 71-76 arrayed along each side of the zone, with the first, fourth and sixth plates 71, 74 and 76 being ungrooved. The grooved plates 72, 73 and 75 shown in this figure can be identical to the plates shown in FIGS. 10 and/or 11, although any of the plates described herein could be incorporated in this arrangement.

Figure 13:
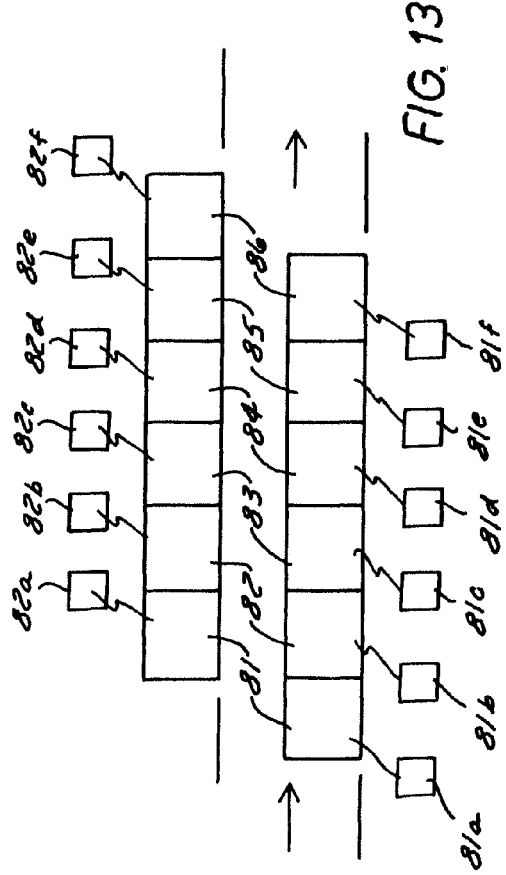
FIG. 13 is a somewhat schematic front perspective view of gangs of six heating plates at each side of the heating zone, with each plate having an individual temperature control means.

FIG. 13 shows a still further arrangement, wherein six plates 81-86 are arranged along each side of the heating zone (any of the plates described herein could be used), wherein separate temperature controllers 81a-81f and 82a-82f are associated with each of the twelve plates.

Although the grooves have been described in some of the embodiments as being filled with a Teflon material, other materials, e.g., ceramics, may be suitable, or the grooves may be left open. The purpose of filling the grooves is to provide a smooth surface that does not unnecessarily wear the belts or transmit heat. Further, any number of similar or different heating plates having the same or different wattages applied thereto can be used, as desired or necessary, and need not be limited to the number shown in the drawings.

While particular embodiments of the invention have been illustrated and described in detail herein, it should be understood that various changes and modifications may be made in the invention without departing from the spirit and intent of the invention as defined by the appended claims.

What is claimed is:

1. A stack of cut sheets of paper wrapped with a protective wrap material enclosing the stack and folded so that overlapping flaps of the wrap material cover opposite ends of the stack, said overlapping flaps being secured and sealed together only at selected areas that together comprise a minor portion of the overlapped flaps, wherein said secured together areas consist of two parallel spaced apart bands extending across said ends from one side of the stack to the other, said bands each having a first width and spaced apart a distance approximately equal to said first width, a lower edge portion of an outer overlapping flap being unattached to an underlying flap and defining a free edge having substantial width that may be easily grasped with the fingers to detach the secured and sealed together flaps and facilitate opening of the wrapped stack of cut sheets of paper, and wherein the sealed areas have sufficient burst strength to avoid inadvertent opening of the wrap but at the same time are relatively easy to separate when it is desired to open the wrap to gain access to the cut sheets of paper.

2. A wrapped stack of cut sheets of paper as claimed in claim 1, wherein:
the protective wrap material is a heat sealable material; and
the selected areas are fused together by applying heat to the overlapped material at the ends of the stack.

3. The wrapped stack of cut sheets of paper as claimed in claim 1, wherein the burst strength of the wrap material as measured by TAPPI 403 is from about 140 to about 200 lbs/square inch.

4. The wrapped stack of cut sheets of paper as claimed in claim 1, wherein the burst strength of the wrap material as measured by TAPPI 403 is from about 145 to about 185 lbs/square inch.

5. The wrapped stack of cut sheets of paper as claimed in claim 1, wherein the burst strength of the wrap material as measured by TAPPI 403 is from about 150 to about 175 lbs/square inch.

6. The wrapped stack of cut sheets of paper as claimed in claim 1, wherein said two bands are approximately equal in surface area and said free edge has a width approximately equal to said first width.

7. The wrapped stack of cut sheets of paper as claimed in claim 1, wherein:
said free edge has a width of about 8 mm.

8. The wrapped stack of cut sheets of paper as claimed in claim 1, wherein:
said free edge has a width of about 10 mm.

9. The wrapped stack of cut sheets of paper as claimed in claim 1, wherein:
said free edge has a width of from about 8 mm to about 10 mm, said first width is about 8 mm, and said secured and sealed together areas are spaced apart a distance of about 7 mm.

10. The wrapped stack of cut sheets of paper as claimed in claim 1, wherein:
all of said secured and sealed together areas combined comprise less than one half the total overlapped area of the overlapped flaps.

11. A stack of cut sheets of paper wrapped with a protective wrap material enclosing the stack and folded so that overlapping flaps of the wrap material cover opposite ends of the stack, wherein:
said overlapping flaps are secured and sealed together only at selected areas that together comprise a minor portion of the overlapped flaps;
said secured together areas consisting of two parallel spaced apart bands extending across said ends from one side of the stack to the other, said bands each having a width of about 7 mm and being spaced apart about 8 mm;
a lower edge portion of an outer overlapping flap being unattached to an underlying flap and defining a free edge having a width of from about 8 mm to about 10 mm that may be easily grasped with the fingers to detach the secured together flaps and facilitate opening of the wrapped stack of cut sheets of paper; and
wherein the secured together areas have sufficient burst strength to avoid inadvertent opening of the wrap but at the same time are relatively easy to separate when it is desired to open the wrap to gain access to the cut sheets of paper.

12. A stack of cut sheets of paper wrapped with a protective wrap material enclosing the stack and folded so that overlapping flaps of the wrap material cover opposite ends of the stack, wherein:
said overlapping flaps are secured and sealed together only at selected areas that together comprise a minor portion of the overlapped flaps;
said secured together areas consisting of three parallel spaced apart bands extending across said ends from one side of the stack to the other, said bands each having a width of about 5 mm and being spaced apart about 10 mm;
a lower edge portion of an outer overlapping flap being unattached to an underlying flap and defining a free edge having a width of from about 8 mm to about 10 mm that may be easily grasped with the fingers to detach the secured together flaps and facilitate opening of the wrapped stack of cut sheets of paper; and
wherein the secured together areas have sufficient burst strength to avoid inadvertent opening of the wrap but at the same time are relatively easy to separate when it is desired to open the wrap to gain access to the cut sheets of paper.

13. A stack of cut sheets of paper wrapped with a protective wrap of heat sealable material enclosing the stack and folded so that overlapping flaps of the wrap material cover opposite ends of the stack, said overlapping flaps being heat sealed together only at selected areas that together comprise a minor portion of the overlapped flaps, wherein said heat sealed areas consist of three spaced apart bands extending across said ends from one side of the stack to the other, said bands each having a first width, a lower edge portion of an outer overlapping flap being unattached to an underlying flap and defining a free edge having substantial width that may be easily grasped with the fingers to detach the secured and sealed together flaps and facilitate opening of the wrapped stack of cut sheets of paper, and wherein the sealed areas have sufficient burst strength to avoid inadvertent opening of the wrap but at the same time are relatively easy to separate when it is desired to open the wrap to gain access to the cut sheets of paper.

14. The wrapped stack of cut sheets of paper as claimed in claim 13, wherein:
   each band is spaced from an adjacent band a distance greater than the width of the respective bands.

15. The wrapped stack of cut sheets of paper as claimed in claim 14, wherein:
   said distance is twice as great as said width of a band.

16. A stack of cut sheets of paper wrapped with a protective wrap material enclosing the stack and folded so that overlapping flaps of the wrap material cover opposite ends of the stack, said overlapping flaps being secured and sealed together only at selected areas that together comprise a minor portion of the overlapped flaps, wherein said secured together areas consist of at least two two parallel spaced apart bands extending across said ends from one side of the stack to the other, said bands each having a first width and spaced apart a distance approximately equal to said first width, a lower edge portion of an outer overlapping flap being unattached to an underlying flap and defining a free edge having a width approximately equal to said first width and that may be easily grasped with the fingers to detach the secured and sealed together flaps and facilitate opening of the wrapped stack of cut sheets of paper, and wherein the sealed areas have sufficient burst strength to avoid inadvertent opening of the wrap but at the same time are relatively easy to separate when it is desired to open the wrap to gain access to the cut sheets of paper.

* * * * *